United States Patent [19]

Lederman

[11] Patent Number: 4,606,554

[45] Date of Patent: Aug. 19, 1986

[54] TOPSY-TURVY BOOK

[76] Inventor: Elsie J. Lederman, 630 Victory Blvd., Apt. 6-G, Staten Island, N.Y. 10301

[21] Appl. No.: 800,449

[22] Filed: Nov. 21, 1985

[51] Int. Cl.[4] .......................... B42D 1/00; B42D 3/08; A63F 1/02; G09B 11/04

[52] U.S. Cl. ...................................... 281/15 R; 281/1; 273/284; 434/88

[58] Field of Search ........................ 434/81, 83, 84, 85, 434/86, 87, 88, 91, 157; 273/284, 285; 281/1, 15 R, 16, 21 R, 21 A, 22

[56] References Cited

U.S. PATENT DOCUMENTS

| | | | |
|---|---|---|---|
| 1,584,062 | 5/1926 | Williamson | 273/292 |
| 2,258,603 | 10/1941 | Forbell | 434/88 |
| 4,073,070 | 2/1978 | Boston | 434/84 |
| 4,143,889 | 3/1979 | Scharlin | 434/88 |
| 4,216,979 | 8/1980 | Janik | 281/1 |

*Primary Examiner*—Paul A. Bell
*Assistant Examiner*—Paul M. Heyrana, Sr.
*Attorney, Agent, or Firm*—Richard L. Miller

[57] ABSTRACT

A book for children made of a plurality of sheets bound between a front and rear cover, each sheet being printed with pictures or the like, and when the book is opened, the right side pages are topsy-turvy to the left side pages for being seen from opposite directions.

6 Claims, 4 Drawing Figures

TOPSY-TURVY BOOK

BACKGROUND OF THE INVENTION

This invention relates generally to children's books. More particularly it relates to such children books that are known as activity or busy-work books as for example: coloring books or puzzle picture books such as contain "Follow the Dot" diagrams, or the like; and is an improvement over the U.S. Pat. No. 1,584,062 to Williamson; No. U.S. Pat. No. 3,271,091 to Henry; and U.S. Pat. No. 4,073,070 to Boston.

It is well known that today all such children books are made for a child to entertain himself alone, but sometimes the child wishes for friend to participate together with him in the activity. This is usually not convenient to do because the children crowd each other while alongside one another, even if one is working on the left side page and the other is working on the right side page of the book. This can promote pushing one another and dissension, and so is in need of an improvement.

SUMMARY OF THE INVENTION

Accordingly it is a principal object of the present invention to provide a children's book which is more convenient for two children to use at a same time, by means of each left side page being topsy-turvy to each right side page, so that a child working a left side page is on one side of the book while a child working a right side page is on an opposite side of the book, so that both children have more room, while participating together in a same activity.

Another object is to provide a topsy-turvy book which can be used if the children are either seated at the table or else sprawled out on a floor.

Yet another object is to provide a topsy-turvy book which is useful in nursery schools and kindergartens as a space saver and which is economical.

Yet a further object is to provide a topsy-turvy book which children will love because it lets them play together with a friend, and accordingly would be ideal for families having more than one child, particularly if one is left handed.

Other objects are to provide a topsy-turvy book which is simple in design, inexpensive to manufacture and gives an interesting variety to conventional books.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENT

Figure 1:
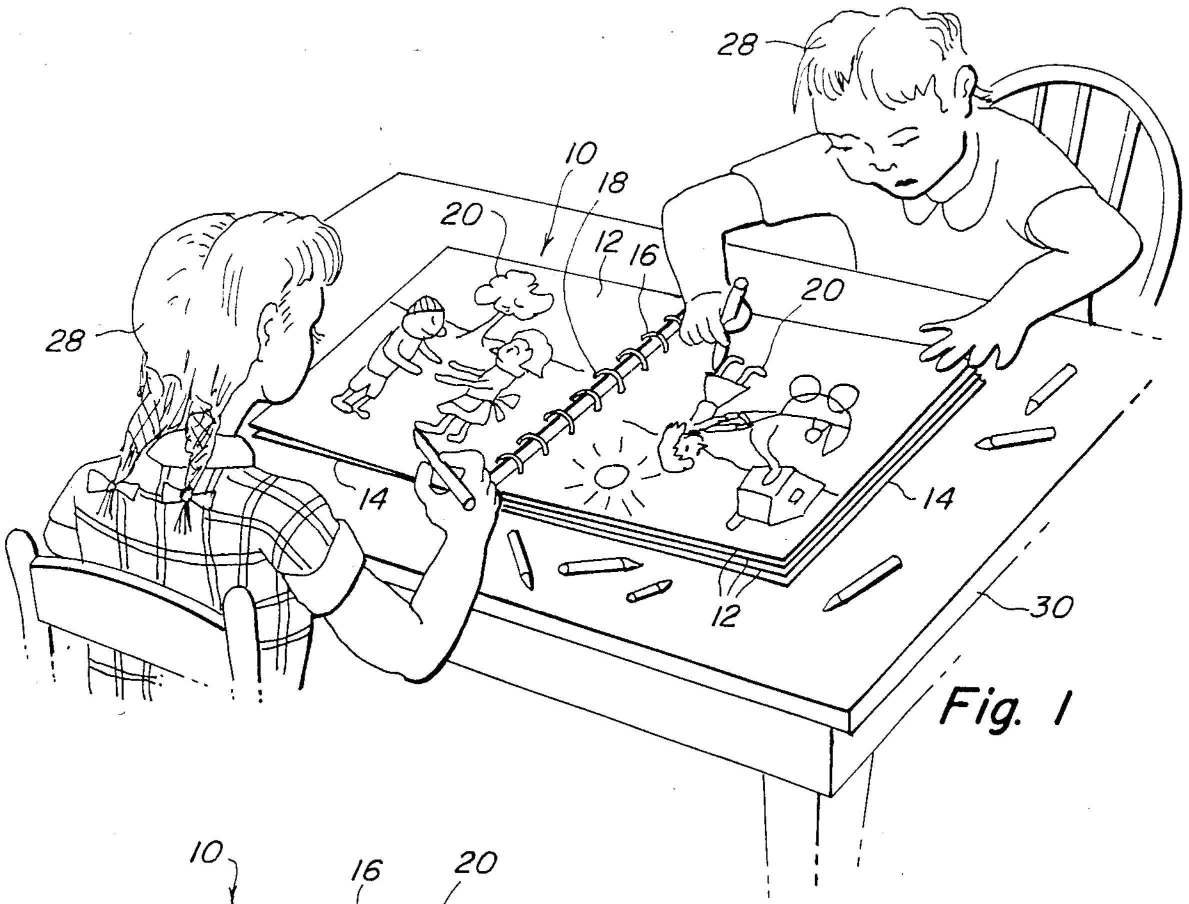
FIG. 1 is a perspective view of the invention shown in use.
Figure 2:
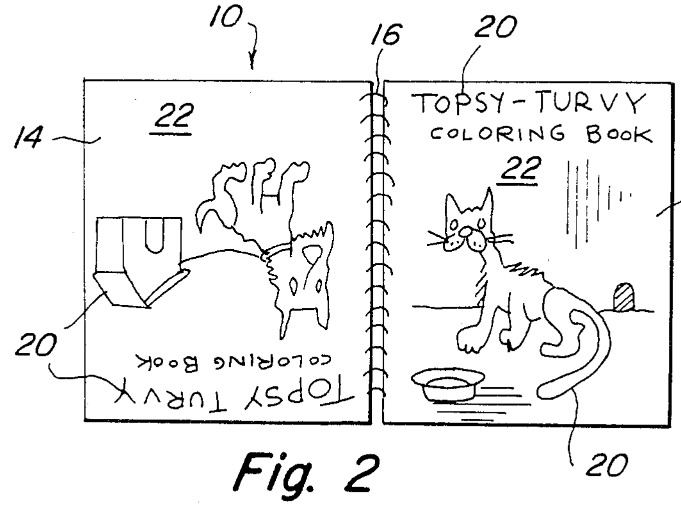
FIG. 2 is a view of the book opened up, and showing its front and rear covers.

Referring now to the Drawing in greater detail, and more particularly to FIGS. 1 and 2 thereof, at this time, the reference numeral 10 represents a topsy-turvy book, according to the present invention, wherein the same is comprised of a plurality of sheets 12 between a pair of covers 14, either of which forms the front or rear cover. The sheets and covers may be fastened together by any conventional book binding method such as by stitching or else the book may be simply assembled like a lose-leaf notebook by means of rings or a spiralled wire 16 through holes 18 so that the book rests flat when opened. The important feature of the book is that the pictures or text 20 on the right side page of the opened up book is topsy-turvy to the left side page, or vice versa, as shown in FIG. 1. The same situation is seen when the book is opened and the outer sides 22 of the both front and rear covers are observed, as shown in FIG. 2. Thus either cover becomes a front cover and the other becomes the rear cover, depending up from which direction the book is seen.

Figure 3:
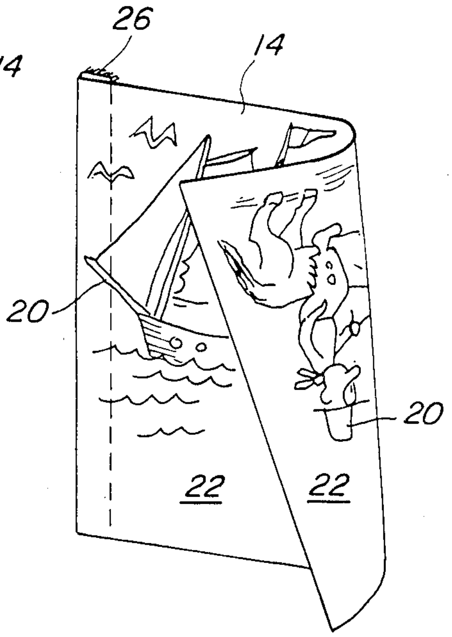
FIG. 3 is a page of the book showing pictures on opposite side being up side down from each other.
Figure 4:
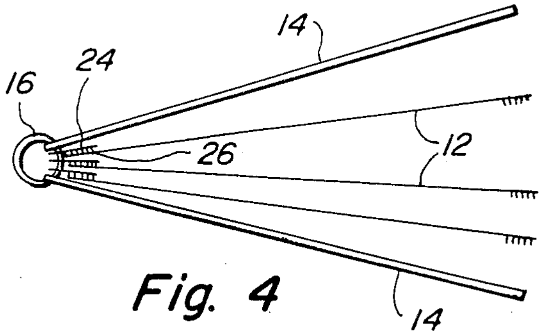
FIG. 4 is an edge view of the book showing the pages fanned out.

Referring now to FIGS. 3 and 4, it is to be noted that the book pages 12 may be made removable from the book, without being torn or ripped out, by means of VELCRO ® loop pile fastener stripes 24 and 26, one of which is held on the spiralled wire 16 and the other of which is adhered to the sheet; the strips being detachably attached together, so that a child can remove and save any that he likes. As shown in FIG. 3, pages on opposite sides of a same sheet are upside down relative to each other. The topsy-turvy book is ideal for the two children 28 seated on opposite sides of the table 30 or when sprawled out on a floor.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A topsy-turvy book, comprising in combination, a plurality of sheets and a pair of covers, said sheets being positioned between said covers, said book in opened up position showing a left side page and a right side page of an adjacent pair of said sheets, and pictorial and textual indicia printed on one side page being topsy-turvy to the other side page.

2. The combination as set forth in claim 1, wherein said pair of covers form front and rear covers for said book, and printed pictorial and textual indicia on outer sides of said covers being topsy-turvy to each other.

3. The combination as set forth in claim 2, wherein said book is assembled together by a spiralled wire through holes in each said cover and all said sheets.

4. The combination as set forth in claim 2, wherein said book is assembled together by means of a plurality of lose-leaf notebook rings through holes in each said cover and all said sheets.

5. The combination, as set forth in claim 2, wherein said book is assembled by stitching said covers and said pages together.

6. The combination, as set forth in claim 2, wherein said book is assembled by VELCRO ® loop pile fastener means holding said covers and said pages together.

* * * * *